United States Patent
Hammerschmidt et al.

(10) Patent No.: US 11,671,409 B2
(45) Date of Patent: Jun. 6, 2023

(54) ENCRYPTED COMMUNICATION OF A SENSOR DATA CHARACTERISTIC

(71) Applicant: Infineon Technologies AG, Neubiberg (DE)

(72) Inventors: Dirk Hammerschmidt, Finkenstein (AT); Christof Michenthaler, Gail (AT)

(73) Assignee: Infineon Technologies AG, Neubiberg (DE)

( * ) Notice: Subject to any disclaimer, the term of this patent is extended or adjusted under 35 U.S.C. 154(b) by 39 days.

(21) Appl. No.: 17/249,030

(22) Filed: Feb. 17, 2021

(65) Prior Publication Data

US 2022/0263806 A1 Aug. 18, 2022

(51) Int. Cl.
*H04L 9/40* (2022.01)

(52) U.S. Cl.
CPC .............. *H04L 63/0428* (2013.01)

(58) Field of Classification Search
CPC .................................................. H04L 63/0428
USPC ......................................................... 380/37
See application file for complete search history.

(56) References Cited

U.S. PATENT DOCUMENTS

| | | | |
|---|---|---|---|
| 8,966,289 B2* | 2/2015 | Prochaska | H04L 9/12 726/34 |
| 9,106,623 B2* | 8/2015 | Paddon | H04W 4/029 |
| 9,127,610 B2* | 9/2015 | Smith | F02D 41/22 |
| 9,252,945 B2* | 2/2016 | Lewis | H04L 9/3226 |
| 9,349,287 B1* | 5/2016 | Holzwanger | G08G 1/096716 |
| 9,509,445 B2 | 11/2016 | Hammerschmidt et al. | |
| 9,973,835 B2 | 5/2018 | Hainz et al. | |
| 10,026,306 B2 | 7/2018 | Hammerschmidt | |
| 2010/0328074 A1* | 12/2010 | Johnson | G06F 21/31 340/573.1 |
| 2014/0214970 A1* | 7/2014 | Rasbornig | H04L 1/22 709/206 |
| 2014/0304511 A1* | 10/2014 | Lewis | H04L 9/0637 713/170 |
| 2015/0236876 A1* | 8/2015 | Cadugan | H04L 7/042 375/242 |
| 2017/0337392 A1* | 11/2017 | Dang | G06F 21/6245 |
| 2021/0392496 A1* | 12/2021 | Vladimerou | H04W 12/61 |

FOREIGN PATENT DOCUMENTS

DE 102012218454 A1 4/2013

* cited by examiner

*Primary Examiner* — Amare F Tabor

(74) *Attorney, Agent, or Firm* — Harrity & Harrity, LLP

(57) ABSTRACT

A sensor may obtain sensor data. The sensor may transmit the sensor data to a controller via a sensor-controller interface. The sensor may determine, based on the sensor data, a security characteristic for the sensor data. The sensor may encrypt the security characteristic to generate an encrypted security characteristic. The sensor may transmit the encrypted security characteristic to the controller via the sensor-controller interface.

20 Claims, 4 Drawing Sheets

ENCRYPTED COMMUNICATION OF A SENSOR DATA CHARACTERISTIC

BACKGROUND

A system may include a sensor (e.g., a magnetic sensor) and a controller (e.g., an electronic control unit (ECU)). The sensor may be configured to obtain sensor data (e.g., based on measuring one or more physical quantities) and provide the sensor data to the controller via a sensor-controller interface of the system. The controller may be configured to receive the sensor data and, for example, control one or more systems (e.g., one or more electrical systems or electrical subsystems) based at least in part on the sensor data.

SUMMARY

In some implementations, a sensor includes one or more components to obtain sensor data; transmit the sensor data to a controller via a sensor-controller interface; determine, based on the sensor data, a security characteristic for the sensor data; encrypt the security characteristic to generate an encrypted security characteristic; and transmit the encrypted security characteristic to the controller via the sensor-controller interface.

In some implementations, a controller includes one or more components to receive sensor data from a sensor via a sensor-controller interface; determine, based on the sensor data, a security characteristic for the sensor data; receive an encrypted security characteristic from the sensor via the sensor-controller interface; decrypt the encrypted security characteristic to determine a decrypted security characteristic; and determine whether the decrypted security characteristic matches the determined security characteristic.

In some implementations, a method includes transmitting, by a sensor in a system and via a sensor-controller interface, sensor data obtained by the sensor; determining, by the sensor, a sensor-side security characteristic for the sensor data; encrypting, by the sensor, the sensor-side security characteristic to generate an encrypted sensor-side security characteristic; transmitting, by the sensor and via the sensor-controller interface, the encrypted sensor-side security characteristic; receiving, by a controller of the system and via the sensor-controller interface, the sensor data and the encrypted sensor-side security characteristic; decrypting, by the controller, the encrypted sensor-side security characteristic to determine the sensor-side security characteristic; determining, by the controller, a controller-side security characteristic based on the sensor data; and determining, by the controller, whether the sensor-side security characteristic matches the controller-side security characteristic.

DETAILED DESCRIPTION

Figure 1:
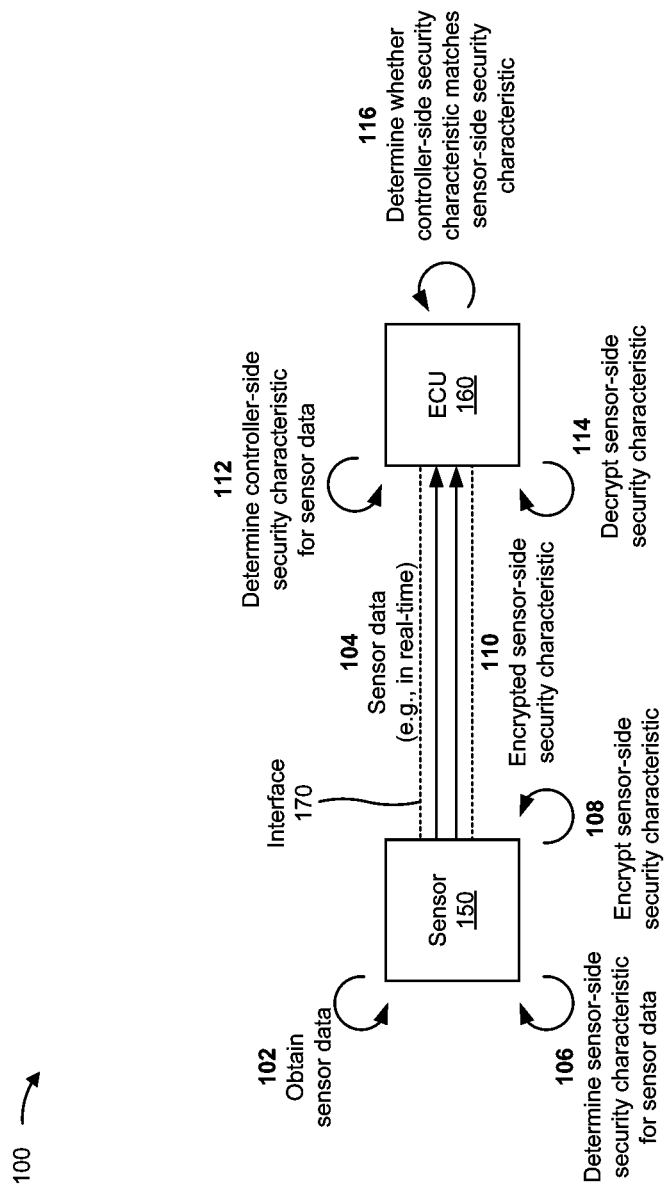
FIG. 1 is a diagram of an example system that performs operations associated with encrypted communication of a sensor data characteristic, as described herein.

The following detailed description of example implementations refers to the accompanying drawings. The same reference numbers in different drawings may identify the same or similar elements.

Generally, communications between controllers (i.e., control units) of a system may be protected from cyber-attacks, data manipulation, or other malicious activity, using particular security measures and/or security protocols. For example, in an automotive application, the Secure Onboard Communication (SecOC) module (standardized by the Automotive Open System Architecture (AUTOSAR) partnership) may be used to protect communications between controllers within a vehicle. Here, a Transport Layer Security (TLS) protocol, an Internet Protocol Security (IPSec) protocol, or another type of protocol may be used, depending on the bus technology and the particular application. Common among these traditional security mechanisms is that security is not based on secrecy of a cryptographic algorithm. Rather, security is based on confidentiality of keys used for performing cryptographic operations. In some instances, a key may be used for only one security mechanism to further improve security.

As noted above, cryptographic keys can in practice be used to secure communications between controllers (e.g., communications between a first ECU and a second ECU). This enables a controller that receives a message to detect whether the message is a replay of a recorded message, to check authenticity of the sender of the message, to determine integrity of transmitted data in the message, or the like. The use of such cryptographic procedures for securing controller-to-controller communication has therefore reduced vulnerability of communicated information to manipulation. As a particular example, in the automotive context, communication interfaces (e.g., Controller Area Network (CAN), Flexray, Automotive Ethernet, or the like) between controllers may provide security against cyber-attacks. Such protection may be needed to provide protection against manipulation of vehicle functionalities (e.g., changing a value of a distance counter, tuning a motor, or the like), theft protection by rejection of unauthorized bus participants (e.g., stolen ECUs), and protection against fleet attacks (e.g., ransom attacks against a manufacturer). These operations are supported by cryptographic hardware included in the controllers of automotive systems.

Notably, the secure nature of controller-controller interfaces has caused manipulation attempts to shift toward sensor-controller interfaces. Such sensor-controller interfaces are not typically secure against manipulation (e.g., sensor-controller interfaces are not typically encrypted). In one example, a speed sensor in a vehicle may use a current interface implementation for communicating speed sensor data, where the current interface uses current pulses (e.g., pulse-width modulation (PWM) pulses) to communicate the speed sensor data. However, without protection on the sensor-controller interface, these current pulses could be manipulated by an attacker with relatively simple electronics. One potential result of manipulation of the speed sensor data could be manipulation of a parameter (e.g., a lifetime parameter) of the vehicle. Another potential result of manipulation of the speed sensor data could be alteration of speed values used by an electronic stability program (ESP) ECU (e.g., the ESP ECU may determine that a speed of the vehicle is 30 kilometers per hour (km/h) when in fact the speed of the vehicle is 90 km/h). Such speed value manipulation could result in, for example, an improper control strategy for braking, which could cause a dangerous driving situation. In another example, sensor data transmitted by an anti-lock brake system (ABS) sensor could be manipulated on an interface between the ABS sensor and a controller to reduce a distance driven by a vehicle (e.g., to increase a resale price of the vehicle). In still another example, sensor data transmitted by a current sensor could be manipulated on an interface between the current sensor and a controller in order to perform impermissible motor tuning.

One technique to address such security issues on a sensor-controller interface is to use cryptographic procedures similar to those used to provide protection for a controller-controller interface. However, a need to perform cryptographic operations (e.g., encryption and decryption) of sensor data would significantly increase latency associated with communicating sensor data, thereby degrading performance of the control functionality. Additionally, hardware on the sensor may not be capable of performing cryptographic operations at a suitable speed (e.g., as compared to cryptographic hardware on the controller), which further degrades performance. Thus, a fully encrypted communication is not a practical solution for protection of a sensor-controller interface.

Some implementations described herein provide techniques and apparatuses for encrypted communication of a sensor data characteristic. In some implementations, a sensor may transmit sensor data via a sensor-controller interface. The sensor may also determine a sensor-side security characteristic for the sensor data. In some implementations, the security characteristic is a value derived from the sensor data. Next, the sensor may encrypt the sensor-side security characteristic, and may transmit the encrypted sensor-side security characteristic via the sensor-controller interface. Notably, the sensor need only encrypt the sensor-side security characteristic (rather than the sensor data itself). A controller may receive the sensor data and the encrypted sensor-side security characteristic via the sensor-controller interface. The controller may then decrypt the encrypted sensor-side security characteristic. The controller may also determine a controller-side security characteristic based on the sensor data. The controller may then determine whether the sensor-side security characteristic matches the controller-side security characteristic. Here, if the sensor-side security characteristic does not match the controller-side security characteristic, then the controller may determine that the sensor data was manipulated on the sensor-controller interface. Conversely, if the sensor-side security characteristic matches the controller-side security characteristic, then the controller may determine that the sensor data was not manipulated on the sensor-controller interface. In this way, authentication and data integrity can be provided for the sensor data received by a controller via a sensor-controller interface without a need to encrypt the sensor data and without increasing of latency in the communication chain.

One advantage provided by the techniques and apparatuses for communication of an encrypted sensor data characteristic described herein is to that a sensor-controller interface can remain backward compatible to established automotive hardware. Another advantage is that cryptographic operations performed by the sensor do not introduce additional latency in association with communicating the sensor data, meaning that system control functions are not impacted. Another advantage is that the cryptographic operations performed by the sensor can be performed over a relatively long time so that impacts on hardware requirements, current consumption, and electromagnetic emission are minimized. Still another advantage is that a data rate required for the sensor-controller interface is only marginally increased by the transmission of the encrypted sensor-side security characteristic.

FIG. 1 is a diagram of an example system 100 that performs operations associated with encrypted communication of a sensor data characteristic, as described herein. As shown in FIG. 1, example system 100 includes a sensor 150 and an ECU 160. As shown, sensor 150 may communicate with ECU 160 via a sensor-controller interface 170 (herein referred to as interface 170). Details regarding sensor 150, ECU 160, and interface 170 are provided below, followed by a description of an example operation of system 100.

Sensor 150 is a device including one or more components of a sensor, such as a magnetoresistive (MR) sensor, a Hall-effect sensor, a variable reluctance sensor (VRS), a fluxgate sensor, and/or another type of sensor. In some implementations, sensor 150 may be, for example, a speed sensor, an angle sensor, a linear Hall sensor, a three-dimensional (3D) Hall sensor, a pressure sensor, a temperature sensor, an acceleration sensor, a current sensor, or another type of sensor that measures a physical quantity. In some implementations, sensor 150 includes one or more components capable of performing one or more cryptographic operations, such as encryption of the sensor-side security characteristic, as described herein. In some implementations, sensor 150 may be connected to ECU 160 such that sensor 150 may transmit information (e.g., sensor data, an encrypted sensor-side security characteristic, or the like) to ECU 160, as described herein. In some implementations, sensor 150 may provide such information to ECU 160 via interface 170. Additional example details regarding sensor 150 are described below with regard to FIGS. 2 and 3.

ECU 160 includes a controller (e.g., a control unit, a control device, or the like) configured to control one or more electrical systems and/or electrical subsystems. For example, in some implementations, ECU 160 may be capable of calibrating, controlling, adjusting, or the like, one or more electrical systems and/or electrical subsystems based on information (e.g., sensor data, an encrypted sensor-side security characteristic, or the like) received from sensor 150. In some implementations, ECU 160 may include, for example, an electronic/engine control module (ECM), a powertrain control module (PCM), a transmission control module (TCM), a brake control module (BCM or EBCM), a central control module (CCM), a central timing module (CTM), a general electronic module (GEM), a body control module (BCM), a suspension control module (SCM), and/or the like. In some implementations, ECU 160 may be connected to sensor 150 such that ECU 160 may receive information from sensor 150, as described herein. In some implementations, ECU 160 may receive such information from sensor 150 via interface 170. Additional example details regarding ECU 160 are described below with regard to FIG. 3.

Interface 170 is a sensor-controller interface between sensor 150 and ECU 160. In some implementations, interface 170 may be, for example, a pulse-based interface, a voltage interface, a current interface, a digital interface, or the like. In some implementations, interface 170 may enable two-way communication between sensor 150 and ECU 160. Alternatively, in some implementations, interface 170 may enable only one-way communication between sensor 150 and ECU 160 (e.g., such that sensor 150 can transmit information to ECU 160 but ECU 160 cannot transmit information to sensor 150).

In an example operation, starting with reference 102 in FIG. 1, sensor 150 may obtain sensor data. The sensor data may include, for example, data related to a physical quantity sensed or measured by sensor 150, such as data indicating a speed of an object, an angle of an object, a position of an object, a pressure in a vicinity of sensor 150, a temperature in a vicinity of sensor 150, an acceleration of sensor 150, and/or another type of sensor data. As shown by reference 104, sensor 150 may transmit, and ECU 160 may receive, the sensor data via interface 170. In some implementations, sensor 150 may transmit, and ECU 160 may receive, the sensor data in real-time or in near real-time.

As shown by reference 106, sensor 150 may determine, based on the sensor data, a security characteristic for the sensor data. The security characteristic is a characteristic of the sensor data that can be extracted, computed, or otherwise determined based on the sensor data and/or the transmission of the sensor data. In some implementations, the security characteristic corresponds to a period of time (e.g., a time window defined by a starting point and a stopping point). That is, in some implementations, the security characteristic may be determined based on sensor data determined or transmitted within a particular period of time.

For example, in some implementations, interface 170 may be a pulse-based interface (e.g., an interface that uses current or voltage pulses for communication of information). In such an example, the security characteristic may be based on information associated with one or more pulses of sensor data within a time window. In this example, sensor 150 may determine the security characteristic based on information associated with the one or more pulses of sensor data within the time window. As a particular example, the security characteristic may be a number of pulses of sensor data transmitted by sensor 150 within the time window. Here, sensor 150 may determine the security characteristic by counting the number of pulses of sensor data transmitted by sensor 150 within the time window. As another particular example, the security characteristic may be a value (e.g., a quotient, a product, a sum, an average, or the like) computed based on a first (e.g., a longest) pulse distance among pulses associated with the sensor data within the time window and a second (e.g., shortest) pulse distance among pulses associated with the sensor data within the time window.

In some implementations, when interface 170 is a pulse-based interface, sensor 150 may identify a starting point of the time window associated with determining the security characteristic, and may determine the security characteristic according to the starting point of the time window. For example, sensor 150 may be configured to identify a particular bit (e.g., a start bit, a stop bit, or the like) of a background frame (e.g., a higher level frame associated with transmitting sensor data to ECU 160) as the starting point associated with counting the number of pulses. Here, upon identifying that the particular bit has, is being, or will be transmitted, sensor 150 may begin counting the number of pulses. In some implementations, sensor 150 may identify a stopping point of the time window (e.g., a time at which sensor 150 is to stop counting pulses) in a similar manner. Alternatively, the stopping point may be configured on sensor 150 (e.g., sensor 150 may be configured to count pulses for a predetermined amount of time). In some implementations, sensor 150 may transmit an indication of the starting point and/or an indication of the stopping point to ECU 160 (e.g., to ensure that sensor 150 and ECU 160 use the same time window for determination of the security characteristic).

As another example, in some implementations, interface 170 may be a digital interface (e.g., an interface that uses a digital communication protocol, such as a short PWM code (SPC) protocol, peripheral sensor interface (PSI) protocol, a digital serial interface (DSI) protocol, a serial peripheral interface (SPI) protocol, a universal asynchronous receiver/transmitter (UART) protocol, a CAN protocol, or the like). In such an example, the security characteristic may be based on one or more portions of the sensor data. In this example, sensor 150 may determine the security characteristic based on processing the one or more portions of the sensor data. In some implementations, sensor 150 may be configured to process the one or more portions of the sensor data using, for example, a data compressor, a filter, a statistical analysis, a checksum generator, an arithmetic algorithm, or the like. Here, a result of processing the one or more portions of sensor data is the security characteristic. Examples of security characteristics that can be determined by processing one or more portions of sensor data include an average value of measurement data over a period of time (e.g., a period of time between transmissions of encrypted security characteristics), a standard deviation of measurement data over the period of time, a cumulative cyclic redundancy check (CRC) value over the period of time, an output of a low pass filter (e.g., when low pass filters are configured on the sensor side of interface 170 and the controller side of interface 170 to filter the sensor data), or the like. Notably, there is a wide variety of different types of security characteristics that can be determined based on processing one or more portions of the sensor data, and the examples provided above are non-exhaustive.

The security characteristic as determined by sensor 150 is herein referred to as a sensor-side security characteristic. The security characteristic as determined by ECU 160 (as described below) is herein referred to as a controller-side security characteristic.

As shown by reference 108, sensor 150 may encrypt the sensor-side security characteristic to generate an encrypted sensor-side security characteristic. In some implementations, sensor 150 may use a Data Encryption Standard (DES) algorithm, an Advanced Encryption Standard (AES) algorithm, a Rivest-Shamir-Adleman (RSA) algorithm, or another type of cryptographic algorithm for encrypting the sensor-side security characteristic. Notably, cryptographic operations performed by sensor 150 do not introduce additional latency in association with communicating the sensor data because transmission of the sensor data is not impacted, meaning that control functions provided by ECU 160 are not impacted. Further, the cryptographic operations performed by sensor 150 can be performed over a relatively long period of time because transmission of the security characteristic is computed over time and is not particularly time-sensitive, meaning that impacts on hardware requirements, current consumption, and electromagnetic emission are minimized.

With respect to key exchange to be used for cryptographic operations of sensor 150 and ECU 160, in some implementations, a cryptographic key can be stored in a non-volatile memory of sensor 150 (e.g., at end-of-line (EOL) production). In some implementations, this can be achieved via a bi-directional sensor protocol or an alternative protocol for calibration and configuration. In some implementations, a manufacturer of sensor 150 may configure sensor 150 with an initial key that is to be used to secure the communication and for additional EOL programming (e.g., at a Tier 1 entity or an original equipment manufacturer (OEM) with knowledge of the key). In some implementations, identification over a secured key reprogramming protocol can be used to overwite the initial key with a key (e.g., a Tier 1 or OEM specific key) that is paired with a key on ECU 160. Here, the initial key can no longer be used, meaning that further changes of the key are possible only with the later-programmed key. In some implementations, in the case of a bi-directional interface, any standard encryption key exchange or key generation algorithms can be used for key exchange between sensor 150 and ECU 160 (as an alternative to the above-described process).

As shown by reference 110, sensor 150 may transmit, and ECU 160 may receive, the encrypted sensor-side security characteristic via interface 170. In some implementations, when interface 170 is a pulse-based interface, sensor 150 may transmit, and ECU 160 may receive, the encrypted sensor-side security characteristic in a background frame that is distributed over a set of pulses. For example, sensor 150 may be configured to transmit sensor data using a pulse-based protocol, and the pulse-based protocol may enable the encrypted sensor-side security characteristic to be transmitted via a background frame that is distributed over multiple pulses. Here, ECU 160 may receive the encrypted sensor-side security characteristic over the multiple pulses that make up the background frame.

In some implementations, when interface 170 is a digital interface, sensor 150 may transmit, and ECU 160 may receive, the encrypted sensor-side security characteristic in one or more bits of a frame associated with a background communication protocol. For example, a foreground protocol may not have sufficient data rate headroom to add additional frames for the communication of the encrypted sensor-side security characteristic while maintaining a timing requirement needed for the communication of the sensor data. In such a case, one or more bits of a message frame may be reserved for background communication, and those one or more bits may be used to communicate the encrypted sensor-side security characteristic. Alternatively, in some implementations, sensor 150 may transmit, and ECU 160 may receive, the encrypted security characteristic in a frame associated with a foreground communication protocol. For example, the foreground protocol may have sufficient data rate headroom to add at least one additional frame for the communication of the encrypted sensor-side security characteristic (e.g., while maintaining a timing requirement). In such a case, the encrypted sensor-side security characteristic can be communicated in an additional frame (e.g., without use of a background communication channel).

As shown by reference 112, ECU 160 may determine the controller-side security characteristic based on the sensor data. In some implementations, a manner in which ECU 160 determines the controller-side security characteristic matches that used by sensor 150 to determine the sensor-side security characteristic. Thus, in the absence of manipulation of the sensor data on interface 170, the controller-side security characteristic should match the sensor-side security characteristic.

As shown by reference 114, ECU 160 may decrypt the encrypted sensor-side security characteristic to determine the sensor-side security characteristic. Here, the encryption/decryption of the sensor-side security characteristic ensures that the sensor-side security characteristic as determined by the ECU 160 has not been manipulated.

As shown by reference 116, ECU 160 may determine whether the controller-side security characteristic (i.e., the security characteristic as determined by ECU 160) matches the sensor-side security characteristic (i.e., the security characteristic as determined by sensor 150). For example, ECU 160 may compare the controller-side security characteristic and the sensor-side security characteristic and determine whether the controller-side security characteristic matches (e.g., is equal to, is within a threshold amount of, is withing a confidence band of, or the like) the sensor-side security characteristic.

In some implementations, if ECU 160 determines that the controller-side security characteristic does not match the sensor-side security characteristic, then ECU 160 may determine that the sensor data was manipulated (or at least that some other error occurred) on interface 170. For example, if the sensor data associated with the time window of the security characteristic is manipulated, then the controller-side security characteristic will not match the sensor-side security characteristic (since the sensor-side security characteristic and the controller-side security characteristic are determined in the same manner). Thus, when the controller-side security characteristic does not match the sensor-side security characteristic, ECU 160 can determine that the sensor data was manipulated (or at least that an error occurred on interface 170). In some implementations, ECU 160 may perform a security action upon determining that the controller-side security characteristic does not match the sensor-side security characteristic. The security action may include, for example, raising an error/warning flag, transmitting a message indicating the determination, decreasing functionality of sensor 150, performing a diagnostic action, or the like.

In some implementations, if ECU 160 determines that the controller-side security characteristic matches the sensor-side security characteristic, ECU 160 may authenticate the sensor data and/or confirm data integrity for the sensor data. In this way, authentication and data integrity can be provided for the sensor data received by ECU 160 via interface 170 without a need to encrypt the sensor data and without increasing latency in the communication chain.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
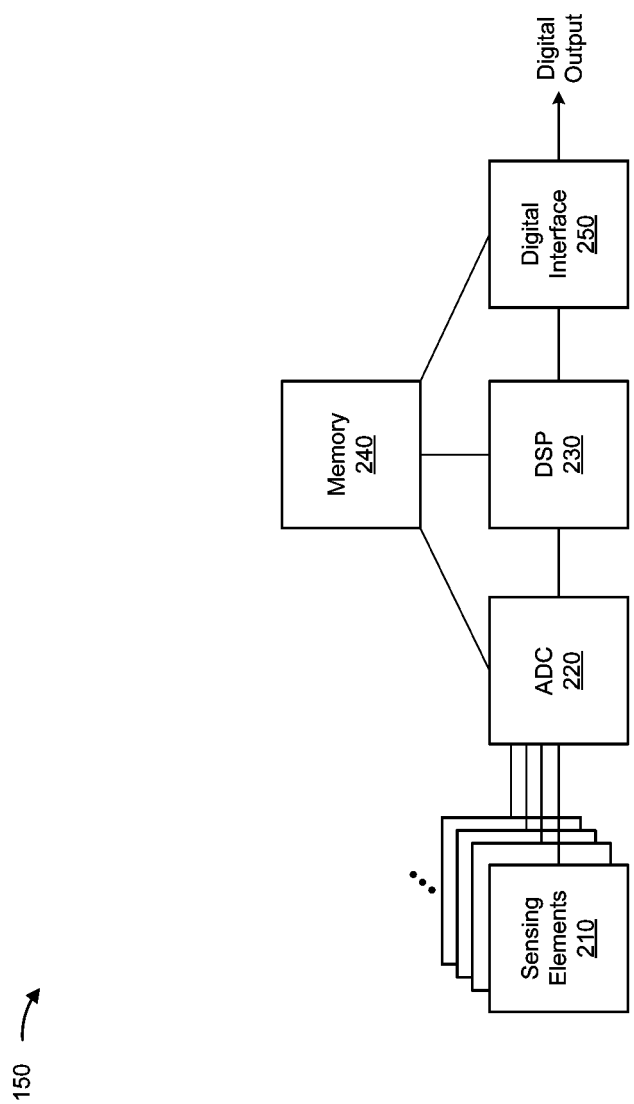
FIG. 2 is a diagram of example components of a sensor described herein.

FIG. 2 is a diagram of example components of sensor 150 in FIG. 1. As shown in FIG. 2, sensor 150 may include a set of sensing elements 210, an analog-to-digital convertor (ADC) 220, a digital signal processor (DSP) 230, a memory element 240, and an interface 250.

Sensing element 210 may include an element for sensing a physical property (e.g., a magnetic field, a temperature, a pressure, or an acceleration, among other examples) in an environment of sensing element 210, and providing and a signal corresponding to the sensed physical property. For example, sensing element 210 may include an element for sensing a component of a magnetic field present at sensor 150 (e.g., a magnetic field generated by a magnet) and providing a signal corresponding to a strength of the sensed magnetic field. In one particular example, sensing element 210 may include a Hall-based sensing element that operates based on a Hall effect. As another particular example, sensing element 210 may include an MR-based sensing element, elements of which are comprised of a magnetoresistive material (e.g., nickel-iron (NiFe)), where the electrical resistance of the magnetoresistive material may depend on a strength and/or a direction of the magnetic field present at the magnetoresistive material. Here, sensing element 210 may operate based on an anisotropic magnetoresistance (AMR) effect, a giant magnetoresistance (GMR) effect, a tunnel magnetoresistance (TMR) effect, and/or the like. As an additional particular example, sensing element 210 may include a variable reluctance (VR) based sensing element that operates based on induction. In some implementations, sensor 150 may include multiple sensing elements 210. Notably, the above-described examples of sensing element 210 are provided for illustrative purposes and, in practice, sensing element 210 can include any type of element capable of sensing a physical property and providing a signal corresponding to the physical property.

ADC 220 may include an analog-to-digital converter that converts an analog signal from the set of sensing elements 210 to a digital signal. For example, ADC 220 may convert analog signals, received from the set of sensing elements 210, into digital signals to be processed by DSP 230. ADC 220 may provide the digital signals to DSP 230. In some implementations, sensor 150 may include one or more ADCs 220.

DSP 230 may include a digital signal processing device or a collection of digital signal processing devices. In some implementations, DSP 230 may receive digital signals from ADC 220 and may process the digital signals to form output signals (e.g., destined for ECU 160), such as an output signal that conveys sensor data, as described elsewhere herein.

Memory element 240 may include a read only memory (ROM) (e.g., an EEPROM), a random access memory (RAM), and/or another type of dynamic or static storage device (e.g., a flash memory, a magnetic memory, an optical memory, etc.) that stores information and/or instructions for use by sensor 150. In some implementations, memory element 240 may store information associated with processing performed by DSP 230. Additionally, or alternatively, memory element 240 may store configurational values or parameters for the set of sensing elements 210 and/or information for one or more other elements of sensor 150, such as ADC 220 or interface 250.

Interface 250 may include an interface via which sensor 150 may receive and/or provide information from and/or to another device, such as ECU 160. For example, interface 250 may provide the output signal, determined by DSP 455 230, to ECU 160 and may further receive information from ECU 160.

The number and arrangement of components shown in FIG. 2 are provided as one or more examples. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) of sensor 150 may perform one or more functions described as being performed by another set of components of sensor 150.

Figure 3:
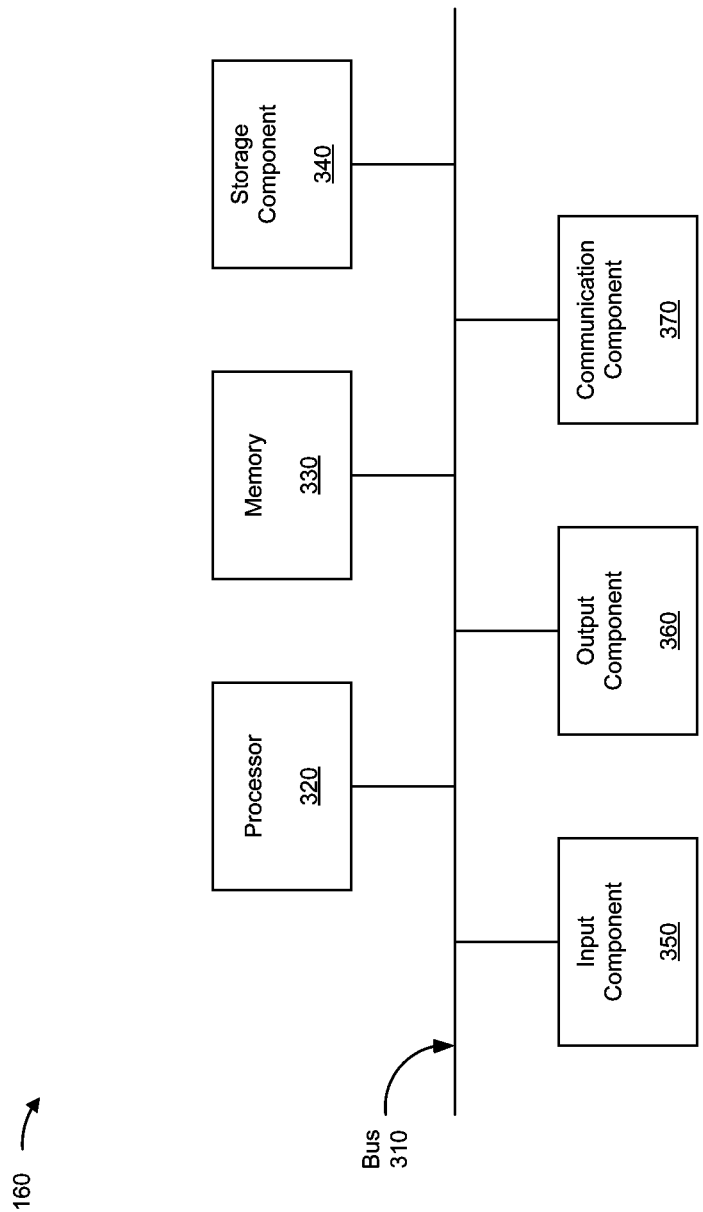
FIG. 3 is a diagram of example components of one or more devices described herein.

FIG. 3 is a diagram of example components of a device 300, which may correspond to sensor 150 and/or ECU 160. In some implementations, sensor 150 and/or ECU 160 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
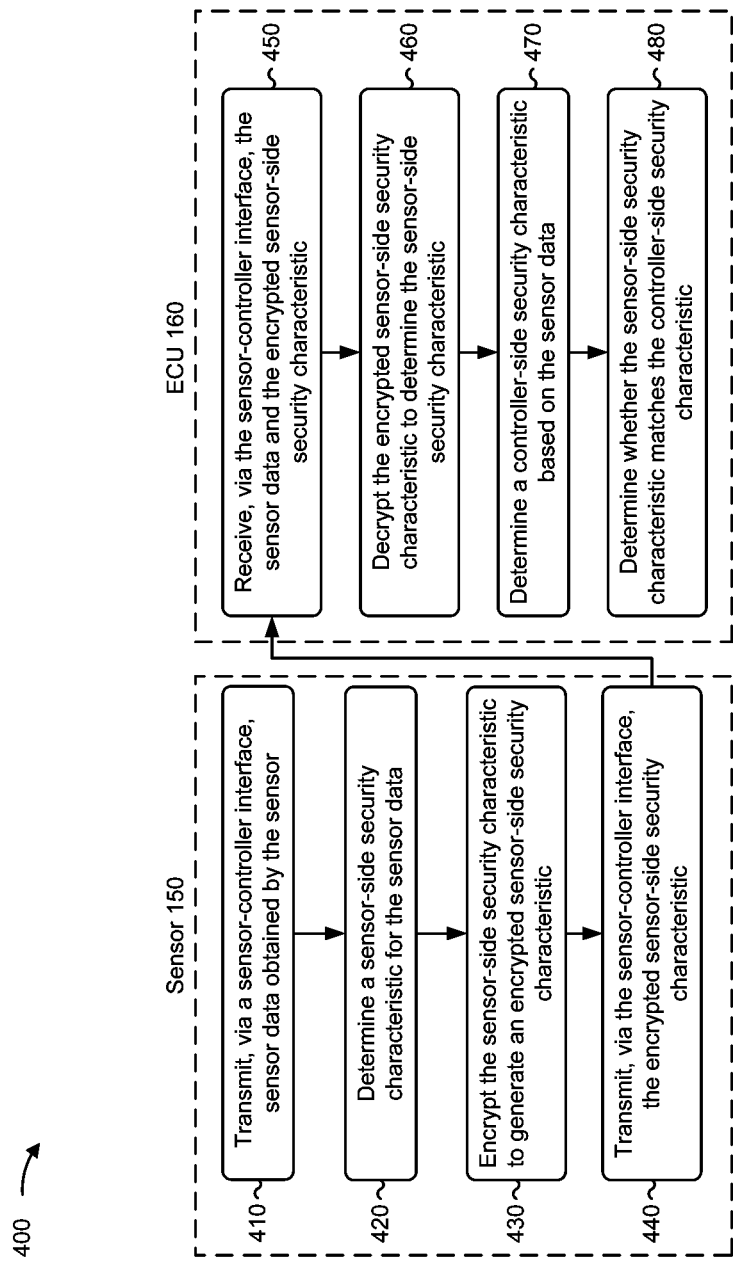
FIG. 4 is a flowchart of an example process relating to encrypted communication of a sensor data characteristic, as described herein.

FIG. 4 is a flowchart of an example process 400 relating encrypted communication of a sensor data characteristic, as described herein. In some implementations, one or more process blocks of FIG. 4 may be performed by a sensor (e.g., sensor 150) and/or a controller (e.g., ECU 160).

As shown in FIG. 4, process 400 may include transmitting, via a sensor-controller interface, sensor data obtained by the sensor (block 410). For example, a sensor (e.g., sensor 150) may transmit, via a sensor-controller interface, sensor data obtained by the sensor, as described above.

As further shown in FIG. 4, process 400 may include determining a sensor-side security characteristic for the sensor data (block 420). For example, the sensor may determine a sensor-side security characteristic for the sensor data, as described above.

As further shown in FIG. 4, process 400 may include encrypting the sensor-side security characteristic to generate an encrypted sensor-side security characteristic (block 430). For example, the sensor may encrypt the sensor-side security characteristic to generate an encrypted sensor-side security characteristic, as described above.

As further shown in FIG. 4, process 400 may include transmitting, via the sensor-controller interface, the encrypted sensor-side security characteristic (block 440). For example, the sensor may transmit, via the sensor-controller interface, the encrypted sensor-side security characteristic, as described above.

As further shown in FIG. 4, process 400 may include receiving, via the sensor-controller interface, the sensor data and the encrypted sensor-side security characteristic (block 450). For example, a controller (e.g., ECU 160) may receive, via the sensor-controller interface, the sensor data and the encrypted sensor-side security characteristic, as described above.

As further shown in FIG. 4, process 400 may include decrypting the encrypted sensor-side security characteristic to determine the sensor-side security characteristic (block 460). For example, the controller may decrypt the encrypted sensor-side security characteristic to determine the sensor-side security characteristic, as described above.

As further shown in FIG. 4, process 400 may include determining a controller-side security characteristic based on the sensor data (block 470). For example, the controller may determine a controller-side security characteristic based on the sensor data, as described above.

As further shown in FIG. 4, process 400 may include determining whether the sensor-side security characteristic matches the controller-side security characteristic (block 480). For example, the controller may determine whether the sensor-side security characteristic matches the controller-side security characteristic, as described above.

Process 400 may include additional implementations, such as any single implementation or any combination of implementations described below and/or in connection with one or more other processes described elsewhere herein.

In a first implementation, the sensor-controller interface is a pulse-based interface, and the sensor and/or the controller, when determining the security characteristic, are to determine the security characteristic by counting a number of pulses within a time window.

In a second implementation, the sensor-controller interface is a pulse-based interface, and the sensor and/or the controller, when determining the security characteristic, are to determine the security characteristic based on information associated with one or more pulses within a time window.

In a third implementation, the sensor-controller interface is a pulse-based interface, and the sensor and/or the controller are further to identify a starting point of a time window associated with determining the security characteristic. Here, the sensor and/or the controller, when determining the security characteristic, determine the security characteristic according to the starting point of the time window.

In a fourth implementation, the sensor is further to transmit, and the controller is to receive, an indication of the starting point of the time window associated with determining the security characteristic.

In a fifth implementation, the sensor-controller interface is a digital interface, and the sensor and/or the controller, when determining the security characteristic, are to determine the security characteristic based on processing one or more portions of the sensor data.

In a sixth implementation, the sensor-controller interface is a pulse-based interface, and the encrypted security characteristic is transmitted or received in a background frame that is distributed over a set of pulses.

In a seventh implementation, the sensor-controller interface is a digital interface, and the encrypted security characteristic is transmitted or received in one or more bits of a frame associated with a background communication protocol.

In an eighth implementation, the sensor-controller interface is a digital interface, and the encrypted security characteristic is transmitted or received in a frame associated with a foreground communication protocol.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items,), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A sensor, comprising:
one or more components to:
obtain sensor data;
transmit the sensor data to a controller via a sensor-controller interface,
wherein the sensor-controller interface includes a pulse-based interface;
identify a starting point of a time window associated with determining a security characteristic for the sensor data;
determine, based on the sensor data, the security characteristic,
wherein the one or more components, when determining the security characteristic, are to determine the security characteristic according to the starting point of the time window,
wherein the security characteristic is generated by the sensor, and
wherein the security characteristic is derived from the sensor data;
encrypt the security characteristic to generate an encrypted security characteristic; and
transmit the encrypted security characteristic to the controller via the sensor-controller interface.

2. The sensor of claim 1, wherein the one or more components, when determining the security characteristic, are to determine the security characteristic by counting a number of pulses within the time window.

3. The sensor of claim 1, wherein one or more components, when determining the security characteristic, are to determine the security characteristic based on information associated with one or more pulses within the time window.

4. The sensor of claim 1, wherein the one or more components are further to transmit an indication of the starting point of the time window.

5. The sensor of claim 1, wherein the sensor-controller interface is a digital interface, and the one or more components, when determining the security characteristic, are to determine the security characteristic based on processing one or more portions of the sensor data.

6. The sensor of claim 1, wherein the encrypted security characteristic is transmitted in a background frame that is distributed over a set of pulses.

7. The sensor of claim 1, wherein the sensor-controller interface includes a digital interface, and the encrypted security characteristic is transmitted in one or more bits of a frame associated with a background communication protocol.

8. The sensor of claim 1, wherein the sensor-controller interface includes a digital interface, and the encrypted security characteristic is transmitted in a frame associated with a foreground communication protocol.

9. A controller, comprising:
one or more components to:
receive sensor data from a sensor via a sensor-controller interface,
wherein the sensor-controller interface includes a pulse-based interface;
identify a starting point of a time window associated with determining a security characteristic for the sensor data;
determine, based on the sensor data, the security characteristic,
wherein the one or more components, when determining the security characteristic, are to determine the security characteristic according to the starting point of the time window
wherein the security characteristic is generated by the controller, and
wherein the security characteristic is derived from the sensor data;
receive an encrypted security characteristic from the sensor via the sensor-controller interface;
decrypt the encrypted security characteristic to determine a decrypted security characteristic,
wherein the decrypted security characteristic is associated with the sensor; and
determine whether the decrypted security characteristic matches the determined security characteristic.

10. The controller of claim 9, wherein the one or more components, when determining the security characteristic, are to determine the security characteristic by counting a number of pulses within the time window.

11. The controller of claim 9, wherein the one or more components, when determining the security characteristic, are to determine the security characteristic based on information associated with one or more pulses within the time window.

12. The controller of claim 1, wherein the one or more components are further to receive an indication of the starting point of the time window.

13. The controller of claim 9, wherein the sensor-controller interface includes a digital interface, and the one or more components, when determining the security characteristic, are to determine the security characteristic based on processing one or more portions of the sensor data.

14. The controller of claim 9, wherein the encrypted security characteristic is received in a background frame that is distributed over a set of pulses.

15. The controller of claim 9, wherein the sensor-controller interface includes a digital interface, and the encrypted security characteristic is received in one or more bits of a frame associated with a background communication protocol.

16. The controller of claim 9, wherein the sensor-controller interface includes a digital interface, and the encrypted security characteristic is received in a frame associated with a foreground communication protocol.

17. The controller of claim 9, wherein the one or more components are further to perform a security action when a result of determining whether the decrypted security characteristic matches the determined security characteristic indicates that the decrypted security characteristic does not match the determined security characteristic.

18. A method, comprising:
transmitting, by a sensor in a system and via a sensor-controller interface, sensor data obtained by the sensor,
wherein the sensor-controller interface includes a pulse-based interface;
identifying a starting point of a time window associated with determining a sensor-side security characteristic for the sensor data;
determining, by the sensor and based on determining the sensor-side security characteristic according to the starting point of the time window, the sensor-side security characteristic,
wherein the sensor-side security characteristic is derived from the sensor data;

encrypting, by the sensor, the sensor-side security characteristic to generate an encrypted sensor-side security characteristic;

transmitting, by the sensor and via the sensor-controller interface, the encrypted sensor-side security characteristic;

receiving, by a controller of the system and via the sensor-controller interface, the sensor data and the encrypted sensor-side security characteristic;

decrypting, by the controller, the encrypted sensor-side security characteristic to determine the sensor-side security characteristic;

determining, by the controller, a controller-side security characteristic based on the sensor data,
   wherein the controller-side security characteristic is associated with the controller, and
   wherein the controller-side security characteristic is derived from the received sensor data; and determining, by the controller, whether the sensor-side security characteristic matches the controller-side security characteristic.

19. The method of claim 18, further comprising:
transmitting an indication of the starting point of the time window.

20. The method of claim 18, further comprising:
receiving an indication of the starting point of the time window.

\* \* \* \* \*